Figure 1:
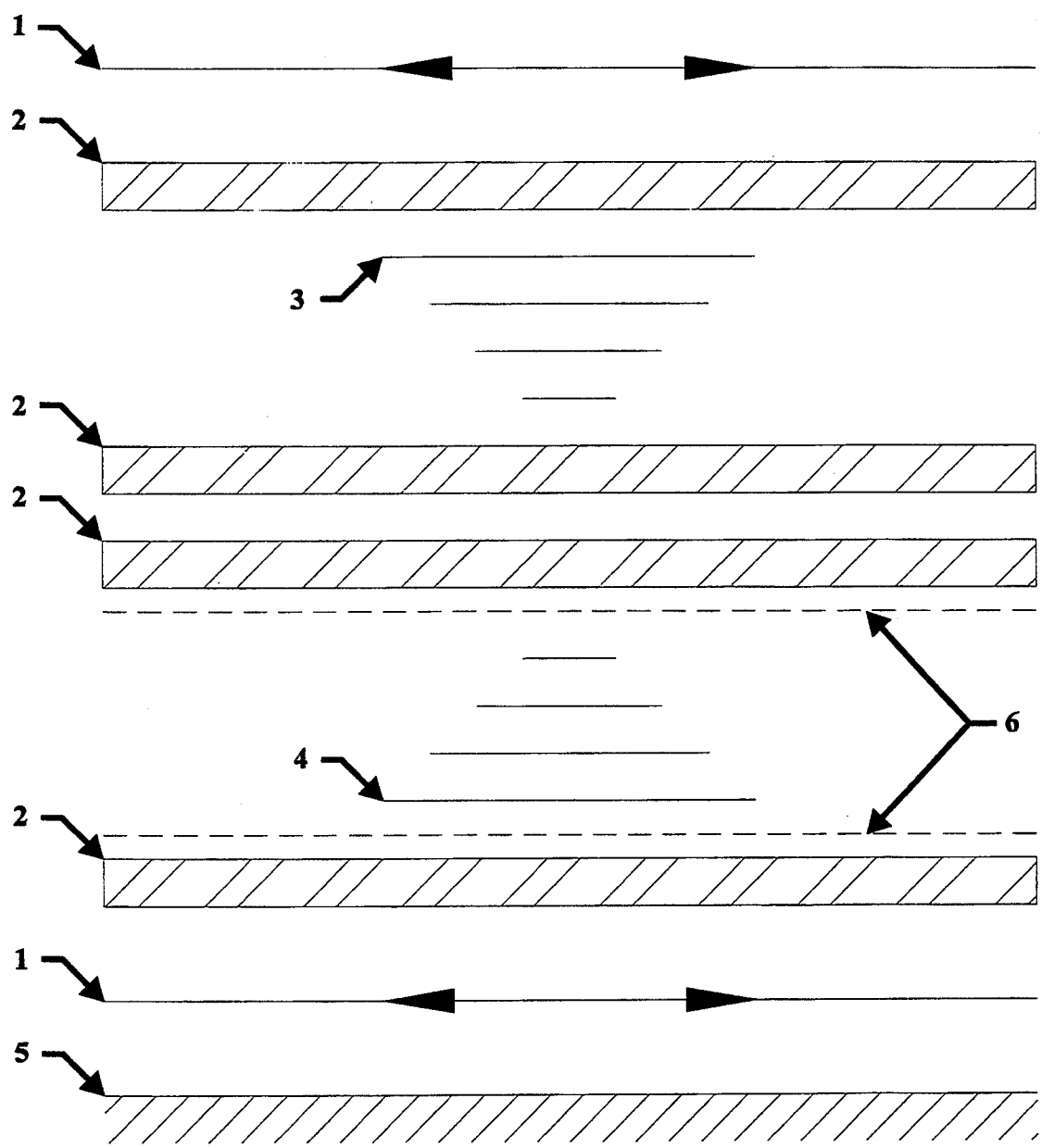

United States Patent [19]

Picken et al.

[11] Patent Number: 5,382,648
[45] Date of Patent: Jan. 17, 1995

[54] TWISTED NEMATIC FILM, A METHOD FOR THE PREPARATION THEREOF, AND A DISPLAY DEVICE COMPRISING SAID FILM

[75] Inventors: Stephen J. Picken, Arnhem; Gustaaf R. Möhlmann, Dieren, both of Netherlands

[73] Assignee: Akzo Nobel nv, Arnhem, Netherlands

[21] Appl. No.: 41,637

[22] Filed: Apr. 1, 1993

[30] Foreign Application Priority Data

Apr. 9, 1992 [NL] Netherlands .................... 9200666

[51] Int. Cl.⁶ .............................................. C08G 18/32
[52] U.S. Cl. ...................................... 528/75; 528/76; 528/78; 528/79; 528/85; 427/58; 428/1; 430/20; 430/270
[58] Field of Search ................. 528/75, 76, 78, 79, 528/85; 427/58; 428/1; 430/20, 270

[56] References Cited

FOREIGN PATENT DOCUMENTS

| | | | |
|---|---|---|---|
| 343422 | 11/1989 | European Pat. Off. | G11B 5/704 |
| 350113 | 1/1990 | European Pat. Off. | C08G 63/68 |
| 380338 | 1/1990 | European Pat. Off. | G02F 1/1335 |
| 423881 | 4/1991 | European Pat. Off. | G02F 1/1335 |
| 478052 | 4/1992 | European Pat. Off. | G11B 7/24 |
| 90-16005 | 12/1990 | WIPO | G02F 1/1335 |

OTHER PUBLICATIONS

Kirk Othmer's Encyclopedia of Technology 3rd edition (New York): Wiley & Sons) vol. 7, pp. 726–732.
W. H. de Jeu, Physical Properties of Liquid Crystalline Materials (New York): Gordon and Breach Science Publishers Ltd., 1990)., Chapter 7, pp. 108–110.
G. Vertogen and W. H. de Jeu, Thermotropic Liquid Crystals, Fundamentals (Berlin Heidelberg: Springer-Verlag, 1988), pp. 147–153.
R. P. Raynes, "Macroscopic Properties of Nematic Liquid Crystals" (1989).

*Primary Examiner*—Maurice J. Welsh
*Attorney, Agent, or Firm*—Richard P. Fennelly; Louis A. Morris

[57] ABSTRACT

The invention relates to a twisted nematic film comprising a non-crosslinked liquid-crystalline polymer having a Tg above 75° C. and a rotational viscosity ($\gamma$) of less than 5000 Pascal.seconds (Pa.s) between Tg and Tni. Such twisted nematic films are used in displays. The invention further relates to methods for the preparation of these twisted nematic films, to the use of said twisted nematic films for optical data storage and in writable compact disks and to a display device comprising such a twisted film.

12 Claims, 1 Drawing Sheet

TWISTED NEMATIC FILM, A METHOD FOR THE PREPARATION THEREOF, AND A DISPLAY DEVICE COMPRISING SAID FILM

The invention relates to a twisted nematic film comprising a liquid-crystalline polymer. Such twisted nematic films are used in displays. FIG. 1 is a schematic depiction of the construction of a display.

FIG. 1 shows a cross-section of a display comprising an active twisted layer (4), which can be switched on and off by means of transparent electrodes (6), and a passive twisted layer (3), with substrates (2) disposed on either side of the two twisted layers (3) and (4). At the outer sides of the two outermost substrates there are polarizers (1), and a mirror (5) is positioned underneath the polarizer situated under the active twisted layer.

The invention is directed, in particular, to the passive twisted layer (3) of a display. Generally, the passive layer use is made of a twisted nematic layer composed of low molecular weight liquid-crystalline material such as is described in, for example, in Kirk Othmer's *Encyclopedia of Technolgly*, 3rd edition (New York: Wiley & Sons) Vol. 7, p. 728. Alternatively, use may be made of birefringent films, for example, a film of drawn polymer. However, the latter fails to provide optimum contrast. While the use of low molecular weight liquid-crystalline material does result in good contrasts, it is attended with other drawbacks, one of them having to do with the fact that low molecular weight liquid-crystalline material is of low viscosity. It is of importance to the passive twisted layers' performance that the twisted structure remains intact across the whole width of the layer. For that reason, the low molecular weight material is sealed between inflexible substrates by means of spacers in order to attain a twisted, form-retaining structure. In other words, a closed, rigid cell has to be made. There is a need in this technical field to develop a passive layer with a twisted nematic structure similar to that comprising a low molecular weight liquid-crystalline layer which does not have to be sealed between substrates with the aid of spacers but which can be made to form a free-standing flexible film. Such a film is made for instance in European Patent Publication No. 423,881 by orienting liquid-crystalline monomers to form a twisted structure and then fixing this structure by curing the monomers by means of, for example, UV irradiation to form a polymer network. The drawback to this method is that the fixation has an adverse effect on the flexibility of the film, yet is necessary to retain the twisted structure. A second disadvantage of this method consists in that only cross-linkable liquid-crystalline monomers may be employed. Furthermore, the film may shrink as it is cured, which makes it hard to set the film thickness. A further disadvantage of shrinking is that hairline cracks may be formed in the film.

The present invention has for its object to produce a film having a twisted nematic structure similar to that of low molecular weight liquid-crystalline layers which is flexible yet has a twisted structure which retains its form. To this end, the twisted nematic film according to the invention comprises a non-crosslinked liquid-crystalline polymer having a Tg above 75° C. and a rotational viscosity ($\gamma$) of less than 5000 Pascal.seconds (Pa.s) between Tg and Tni.

Using a polymer having a glass transition temperature (Tg) above 75° C. enables a film to be obtained which is stable at room temperature and which will retain its twisted structure without spacers being used. The high Tg renders it unnecessary to fix the twisted structure by means of crosslinking, while the film remains flexible. Since the polymer is not cured, shrinkage also does not occur. As a result, the film thickness can be set in advance. The viscosity of the polymer, which is used in accordance with the present invention, must be sufficiently low in the temperature range in which the polymer is oriented (between Tg and the temperature at which the polymer passes from its nematic to its isotropic phase (Tni)). If the viscosity is too high, it will take too long for the polymer layer to be fully formed into a twisted structure or the film may not be even fully oriented.

The orientability of a polymer can be determined from the rotational viscosity ($\gamma$). Its level indicates the magnitude of the external field of force that has to be applied to twist the direction (i.e., the direction in which the mesogenic groups of the liquid-crystalline polymer point) of an aligned liquid-crystalline polymer. Techniques for measuring this rotational viscosity are described in W. H. de Jeu, *Physical Properties of Liquid Crystalline Materials* (New York: Gordon and Breach Science Publishers Ltd., 1980), Chapter 7, pp. 108–110 and in G. Vertogen and W. H. de Jeu, *Thermotropic Liquid Crystals, Fundamentals* (Berlin Heidelberg: Springer-Verlag, 1988), pp. 147–153. These publications, as well as Dr. R. P. Raynes's paper, "Macroscopic Properties of Nematic Liquid Crystals", presented at the conference on "Instrumental Methods in Liquid Crystal Science and Technology," Department of Chemistry, The University, Southampton, U.K., 17–21 July, 1989, also show that if it is not possible to measure the rotational viscosity, the effective viscosity may be taken as a guideline since, in actual practice, it was found to be of the same order of magnitude as the rotational viscosity. The effective viscosity may be measured with the aid of any appropriate viscometer or rheometer known to the person of ordinary skill in the art (for example, a cone-plate viscometer or a couette viscometer).

Needless to say, the orientability of a polymer film is also dependent on the film thickness. The rotational viscosity will need to be lower in the case of thick films than of thin ones. In general, film thicknesses of from about 2 to about 10 micrometers ($\mu$m) can be employed. When a film of a thickness of 2 $\mu$m is made of a polymer having a rotational viscosity of 10,000 Pa.s between Tg and Tni, the orientation time is found to be about thirteen minutes. In the case of a film thickness of 3 $\mu$m, it is as much as thirty minutes. Such long orientation periods are unacceptable for commercial applications, for which orientation periods of up to ten minutes are desired. When employing a polymer having a rotational viscosity between Tg and Tni of 3700 Pa.s and a layer thickness of 2 $\mu$m, the orientation period is about five minutes, which is acceptable. In the case of films thicker than 5 $\mu$m, the rotational viscosity ($\gamma$) should be lower than 600 Pa.s. A sound guideline indicating how the rotational viscosity ($\gamma$) should be adapted to the layer thickness is that $\gamma \cdot (\text{thickness})^2 \leq 3 \times 10^{-8}$.

In principle, all liquid-crystalline polymers which satisfy the above-mentioned Tg and rotational viscosity ($\gamma$) requirements are suitable for use. The person of ordinary skill in the art can easily check whether a particular liquid-crystalline polymer is suitable for use in twisted nematic liquid-crystalline polymer films.

Polymers which satisfy the aforementioned requirements may be selected from liquid-crystalline polyurethanes, polyesters, polyimides, poly(meth)acrylates, polysiloxanes, polyamides, polycarbonates, and so forth.

It is preferred to make use of liquid-crystalline side-chain polyurethanes and polyesters because, in addition to having a readily settable Tg as well as an optimum rotational viscosity, they are easy to prepare, are reasonably thermally and chemically stable, and are reasonably UV irradiation stable. Especially preferred are the liquid-crystalline polyurethanes and polyesters having mesogenic groups according to formula 1 below:

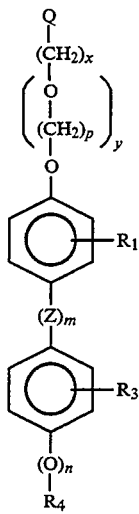

wherein
$R_1 =$ -halogen, $-R_2$, $-OR_2$,

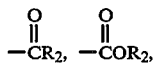

—CN or —CF$_3$;
$R_2 = $ —H or an alkyl group having 1–3 carbon atoms;
$R_3$ may represent the same group as $R_1$, but be selected independently from $R_1$;
Q is the monomer moiety connecting the mesogenic group to the polymer main chain;
n is 0 or 1;
m is 0 or 1;
y is an integer from 0 through 3;
p is an integer from 2 through 4;
$R_4 =$ an alkyl group having 1–12 carbon atoms;
x is an integer from 1 through 6;
Z= —C≡N—, —N≡C—,

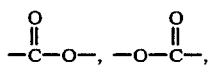

—C≡C—.

These liquid-crystalline polymers may be prepared in a manner analogous to the one used for the preparation of generally known liquid-crystalline polymers.

For the specific preparation of the liquid-crystalline side-chain polyurethanes reference is made to U.S. Pat. application Ser. No. 07/998,698, filed Dec. 30, 1992, which is incorporated herein by reference. In said application the liquid-crystalline side-chain polyurethanes are obtained by reacting, say, diisocyanates with diols containing a mesogenic group according to formula 1, above. For the specific preparation of the liquid-crystalline side-chain polyesters reference is made to U.S. Pat. application Ser. No. 07/764,267, which is also incorporated herein by reference.

The present invention is also directed to methods for the preparation of a twisted nematic film. In the orientation process, a polymer having a Tg of above 75° C. is disposed between two orienting substrates and the resulting assembly is then kept at a temperature above Tg, but below Tni, for some time. On rapid cooling down to room temperature, the twisted structure is frozen, giving a stable film which retains its form.

As stated hereinbefore, preference is given to the use of liquid-crystalline side-chain polyurethanes and polyesters, since they are easy to prepare and readily orientable.

Various methods of making an orienting substrate are known. For instance, the substrate itself may be rubbed along one direction. The substrate in that case may be of, for example, polyimide, polyvinyl alcohol, glass, and so forth. Alternatively, the substrate may be provided with an orienting layer, for instance a rubbed layer of polymer such as polyimide, polyvinyl alcohol, and so forth. Further, this orienting layer may be an SiO$_x$ layer which is vaporized at an angle of less than 90°, usually 60° or 86°. For SiO$_x$ vaporization, generally a substrate of low flexibility, such as glass or quartz, is employed. In order to still obtain a flexible film, it is possible to remove the substrates after the orienting to form a twisted nematic structure. These orienting techniques are known to the person of ordinary skill in the art and require no further elucidation here. Alternatively, of course, other orienting techniques may be used.

A twisted structure is obtained by having the orientation direction of either of the substrates differ by 90° or more (up to about 270°) from the orientation direction of the other substrate. In the former case, there is question of a twisted nematic film; in the latter, of a supertwisted nematic film. To control the direction of twist of the director (to the left or to the right) the liquid-crystalline material is often mixed with a chiral material: a chiral dopant. In principle, all optically active compounds may be employed to this end, examples including cholesterol derivatives and 4-(4-hexyloxy-benzoyloxy) benzoic 2-octyl ester. Normally, use is made of up to 5 wt. % of chiral dopant vis-a-vis the overall polymer. Instead of employing chiral dopants, it may be viable to covalently incorporate chirality into the polymer, for instance by choosing as the alkyl group $R_4$ in formula 1 a group comprising an asymmetric carbon atom.

Another process based on the same inventive idea is as follows. Liquid-crystalline difunctional monomers are disposed between two orienting substrates, oriented to form a twisted structure, and are then polymerized. In this case, the rotational viscosity ($\gamma$) of the monomer mixture should be lower than 5000 Pa.s. Of course, if a stable free-standing film is to be obtained, the Tg of the resulting polymer must be above 75°. In this embodiment the orienting substrates may be removed following orientation, if so desired.

Serviceable monomers should, of course, have mesogenic groups and are, for example, diols, diisocyanates, hydroxyisocyanates, dicarboxylic acids, and hydroxycarboxylic acids. In these difunctional monomers the difunctional moiety, e.g. monomer moiety Q in formula 1, will become part of the polymer's main chain, and the mesogenic groups are generally attached as pendant side-groups.

In addition to being used in displays, the presently described nematic film may be utilized for optical data storage and in writable compact discs. In that case, the nematic film is placed between crossed polarizers. Information is written by means of irradiation with a laser, the twisted nematic structure being destroyed in the irradiated spots. When the written film is scanned (read) by means of a laser, no transmission occurs in the irradiated spots. The twisted nematic film preferably contains a dye for absorption in the near infrared region, which makes it possible to use a solid state laser for writing. Solid state lasers are relatively inexpensive and small in size.

The invention further relates to a display device comprising a film according to the invention.

We claim:

1. A twisted nematic film comprising a liquid-crystalline polymer which is a non-crosslinked liquid-crystalline polymer having a Tg above 75° C. and a rotational viscosity ($\gamma$) of less than 5000 Pascal.seconds (Pa.s) between Tg and Tni.

2. A twisted nematic film according to claim 1, wherein the non-crosslinked liquid-crystalline polymer has a rotational viscosity ($\gamma$) of less than 600 Pa.s. between Tg and Tni.

3. A twisted nematic film according to claim 1, wherein the liquid-crystalline polymer is a liquid-crystalline side-chain polyurethane or polyester.

4. A twisted nematic film according to claim 1 wherein the liquid-crystalline polymer comprises a mesogenic group which satisfies the formula:

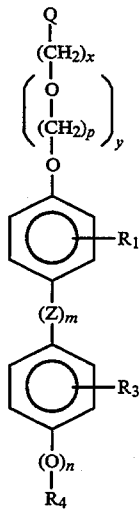

wherein $R_1 =$ —halogen, —$R_2$, —$OR_2$,

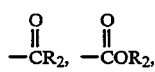

—CN or —$CF_3$;

$R_2 =$ —H or an alkyl group having 1-3 carbon atoms;

$R_3$ may represent the same groups as $R_1$, but be selected independently from $R_1$;

Q is the monomer moiety connecting the mesogenic group to the polymer main chain;

n is 0 or 1;

m is 0 or 1;

y is an integer from 0 through 3;

p is an integer from 2 through 4;

$R_4 =$ an alkyl group having 1-12 carbon atoms;

x is an integer from 1 through 6; and $Z =$ —C≡N—, —N≡C—,

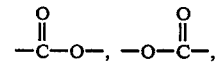

—C≡C—.

5. A method for the preparation of a twisted nematic film in which a liquid-crystalline material is disposed between two orienting substrates of differing directions of orientation, wherein the liquid-crystalline material comprises a liquid-crystalline polymer having a Tg above 75° C. and a rotational viscosity ($\gamma$) of less than 5000 Pa.s. between Tg and Tni.

6. A method according to claim 5, wherein the liquid-crystalline polymer is a liquid-crystalline side-chain polyurethane or polyester.

7. A method according to claim 5, wherein the liquid-crystalline side-chain polymer comprises a mesogenic group which satisfies the formula:

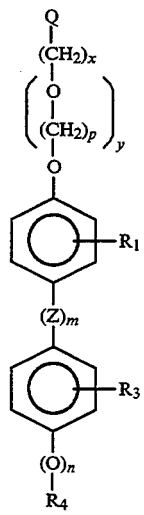

wherein $R_1 =$ —halogen, —$R_2$, —$OR_2$,

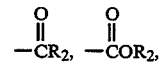

—CN or —$CF_3$;

$R_2 =$ —H or an alkyl group having 1-3 carbon atoms;

$R_3$ may represent the same groups as $R_1$, but be selected independently from $R_1$;

Q is the monomer moiety connecting the mesogenic group to the polymer main chain;

n is 0 or 1;

m is 0 or 1;

y is an integer from 0 through 3;

p is an integer from 2 through 4;

$R_4 =$ an alkyl group having 1-12 carbon atoms;

x is an integer from 1 through 6; and $Z = -C \equiv N-, -N \equiv C-,$

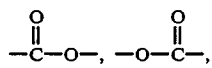

$-C \equiv C-$.

8. A twisted nematic film comprising a liquid-crystalline polymer, wherein the liquid-crystalline polymer is non-crosslinked, has a Tg above 75° C., and is obtained from a liquid-crystalline monomer mixture having a rotational viscosity ($\gamma$) of less than 5000 Pa.s. between Tg and Tni.

9. A method for the preparation of a twisted nematic film in which liquid-crystalline material is disposed between two orienting substrates of differing directions of orientation, wherein the liquid-crystalline material comprises liquid-crystalline difunctional monomers which are oriented to form a twisted structure and then polymerized, with the rotational viscosity ($\gamma$) of a monomer mixture being less than 5000 Pa.s between Tg and Tni, and the Tg of the resulting polymer being above 75° C.

10. An optical data-storage medium comprising a twisted nematic film according to claim 1.

11. A writable compact disc comprising a twisted nematic film according to claim 1.

12. A display device comprising:
a liquid-crystalline cell formed from a twisted nematic liquid-crystalline material disposed between two substrates,
a twisted nematic film according to claim 1, and
a pair of polarizers positioned at the outer sides of the passive twisted nematic film and the liquid-crystalline cell, respectively.

* * * * *